US010981162B2

(12) United States Patent
Ott et al.

(10) Patent No.: US 10,981,162 B2
(45) Date of Patent: Apr. 20, 2021

(54) PIPETTING DEVICE HAVING A PIPETTE TIP DETECTION UNIT AND METHOD FOR DETECTING A PIPETTE TIP ON A PIPETTING DEVICE

(71) Applicant: TECAN TRADING AG, Mannedorf (CH)

(72) Inventors: Philipp Ott, Steg im Tosstal (CH); Thomas Geiges, Mannedorf (CH)

(73) Assignee: TECAN TRADING AG, Mannedorf (CH)

( * ) Notice: Subject to any disclaimer, the term of this patent is extended or adjusted under 35 U.S.C. 154(b) by 211 days.

(21) Appl. No.: 16/309,067

(22) PCT Filed: Jul. 19, 2017

(86) PCT No.: PCT/EP2017/068208
§ 371 (c)(1),
(2) Date: Dec. 11, 2018

(87) PCT Pub. No.: WO2018/015422
PCT Pub. Date: Jan. 25, 2018

(65) Prior Publication Data
US 2019/0310273 A1    Oct. 10, 2019

(30) Foreign Application Priority Data

Jul. 22, 2016 (CH) .................................. 00950/16
Feb. 10, 2017 (CH) .................................. 00159/17

(51) Int. Cl.
*B01L 3/02*    (2006.01)
*G01F 23/26*    (2006.01)
(Continued)

(52) U.S. Cl.
CPC ............. *B01L 3/0275* (2013.01); *B01L 3/021* (2013.01); *B01L 3/54* (2013.01); *B01L 9/54* (2013.01);
(Continued)

(58) Field of Classification Search
CPC ...... B01L 3/021; B01L 3/0275; B01L 3/0279; A61B 5/150022; A61B 5/150099
(Continued)

(56) References Cited

U.S. PATENT DOCUMENTS 3,754,444 A * 8/1973 Ure .................. G01N 35/00732
                                                                  73/863.01
4,338,279 A * 7/1982 Orimo .................. G01N 21/253
                                                                  422/64
(Continued)

FOREIGN PATENT DOCUMENTS

JP    H10123149    *    5/1998    ............. G01F 23/24
JP    H10123149 A       5/1998

OTHER PUBLICATIONS

International Search Report for corresponding PCT application No. PCT/EP2017/068208, dated Oct. 20, 2017.
(Continued)

*Primary Examiner* — Clayton E. LaBalle
*Assistant Examiner* — Kevin C Butler
(74) *Attorney, Agent, or Firm* — Notaro, Michalos & Zaccaria P.C.

(57) ABSTRACT

The invention relates to a pipetting device having an exchangeable pipette tip for suctioning and discharging fluid volumes for use in automated laboratory systems. The invention relates to a pipetting device having a pipette tip detection unit and for detecting a pipette tip on a pipette device of this type. A detection unit detects whether a pipette tip is connected to the pipette tube or determines a charac-
(Continued)

teristic feature of the connected pipette tip. The pipette tip forms at least one portion of a first electrode when the pipette tip is in electrical operative contact with the pipette tube and, e.g., a pipette tip holder, a contact for setting down the pipette tip holder or a working table over which the pipette tube can be moved forms at least one portion of a second electrode.

16 Claims, 5 Drawing Sheets

(51) Int. Cl.
    *G01N 35/10*     (2006.01)
    *B01L 3/00*     (2006.01)
    *G01D 5/241*     (2006.01)
    *G01N 35/00*     (2006.01)
    *B01L 9/00*     (2006.01)
    *B25J 9/16*     (2006.01)

(52) U.S. Cl.
    CPC ............. B01L 9/543 (2013.01); B25J 9/1664 (2013.01); G01D 5/2417 (2013.01); G01F 23/263 (2013.01); G01N 35/0099 (2013.01); G01N 35/00584 (2013.01); G01N 35/00732 (2013.01); G01N 35/1011 (2013.01); G01N 35/1016 (2013.01); *B01L 2200/0605* (2013.01); *B01L 2200/143* (2013.01); *B01L 2300/021* (2013.01); *B01L 2300/0645* (2013.01); *B01L 2400/049* (2013.01); *G01N 2035/00811* (2013.01); *G01N 2035/103* (2013.01); *G01N 2035/1013* (2013.01); *G01N 2035/1025* (2013.01); *G01N 2035/1034* (2013.01)

(58) Field of Classification Search
    USPC ...................................................... 73/864.01
    See application file for complete search history.

(56) References Cited

U.S. PATENT DOCUMENTS

| | | | | |
|---|---|---|---|---|
| 4,451,433 A * | 5/1984 | Yamashita | ....... | G01N 35/00663 422/509 |
| 4,543,238 A * | 9/1985 | Mimura | ............. | G01N 35/1004 422/63 |
| 4,635,478 A * | 1/1987 | Hope | .................... | G01F 23/245 73/292 |
| 4,647,432 A * | 3/1987 | Wakatake | ........ | G01N 35/00663 422/549 |
| 4,714,874 A * | 12/1987 | Morris | ................. | G01N 27/041 324/444 |
| 4,736,638 A * | 4/1988 | Okawa | .................... | G01F 23/24 73/304 C |
| 4,794,085 A * | 12/1988 | Jessop | ................ | G01N 35/1083 422/547 |
| 4,818,492 A * | 4/1989 | Shimizu | ................ | G01F 23/263 422/509 |
| 4,939,925 A * | 7/1990 | Sakuma | ................ | G01N 33/491 73/61.63 |
| 5,004,582 A * | 4/1991 | Miyata | ...................... | B01L 7/00 422/404 |
| 5,045,286 A * | 9/1991 | Kitajima | ............... | B01L 3/0275 141/130 |
| 5,049,826 A * | 9/1991 | Sasao | .................... | G01B 7/023 324/662 |
| 5,104,621 A * | 4/1992 | Pfost | .................... | G01N 21/253 422/521 |
| 5,147,610 A * | 9/1992 | Watanabe | ............ | G01N 35/025 422/64 |
| 5,178,019 A * | 1/1993 | Keiter | ................ | G01N 35/1009 73/863.11 |
| 5,178,835 A * | 1/1993 | Uekusa | ............ | G01N 35/00009 422/63 |
| 5,212,992 A * | 5/1993 | Calhoun | ................ | B01L 3/021 324/690 |
| 5,254,311 A * | 10/1993 | Ushikubo | ............. | G01F 23/242 422/105 |
| 5,304,347 A * | 4/1994 | Mann | ..................... | G01F 23/263 422/50 |
| 5,855,851 A * | 1/1999 | Matsubara | ........... | G01F 23/263 141/130 |
| 5,919,706 A * | 7/1999 | Tajima | .................. | G01F 23/292 422/106 |
| 5,927,547 A * | 7/1999 | Papen | ................... | B01L 3/0268 222/333 |
| 6,107,810 A * | 8/2000 | Ishizawa | ............. | G01F 23/266 324/662 |
| 6,148,666 A * | 11/2000 | Roesicke | ............ | G01F 23/266 340/620 |
| 6,158,269 A * | 12/2000 | Dorenkott | ............ | G01F 11/021 422/562 |
| 6,203,759 B1 * | 3/2001 | Pelc | ...................... | B01L 3/0265 222/333 |
| 6,212,949 B1 * | 4/2001 | Inder | ..................... | G01F 23/245 73/304 R |
| 6,319,718 B1 * | 11/2001 | Matsubara | ............. | G01N 35/02 422/504 |
| 6,551,558 B1 * | 4/2003 | Mann | ...................... | G01F 23/24 116/109 |
| 6,851,453 B2 * | 2/2005 | Lipscomb | .......... | G01N 35/1009 137/557 |
| 6,908,226 B2 * | 6/2005 | Siddiqui | ............. | G01N 35/1011 338/252 |
| 6,948,537 B2 * | 9/2005 | Jones | .................... | B01L 3/0289 141/130 |
| 7,222,526 B2 * | 5/2007 | Baker | ...................... | G01F 23/266 73/290 R |
| 7,250,303 B2 * | 7/2007 | Jakubowicz | .......... | B01L 3/0275 422/130 |
| 7,413,710 B2 * | 8/2008 | Lisec | ...................... | B01L 3/022 422/417 |
| 7,482,939 B2 * | 1/2009 | Wenzig | .................... | G01M 3/26 340/605 |
| 7,794,664 B2 * | 9/2010 | Pelletier | ................ | B01L 3/0275 422/400 |
| 7,804,599 B2 * | 9/2010 | Calderoni | ............. | G01F 23/292 356/445 |
| 7,836,763 B2 * | 11/2010 | Harazin | .................. | G01F 23/26 73/304 C |
| 8,124,027 B2 * | 2/2012 | Lau | ......................... | G01F 19/00 422/501 |
| 8,262,991 B2 * | 9/2012 | Carlsen | ............ | G01N 35/00029 422/63 |
| 8,268,261 B2 * | 9/2012 | Hirafuji | ................. | C12M 33/04 422/501 |
| 8,515,687 B2 * | 8/2013 | Pereira | ................. | F16L 11/127 702/34 |
| 8,996,320 B2 * | 3/2015 | Gwynn | .................. | B01L 3/545 702/55 |
| 9,213,011 B2 * | 12/2015 | Zuppiger | ............ | G01N 27/22 |
| 9,234,906 B2 * | 1/2016 | Holmes | ............ | G01N 35/00722 |
| 9,304,141 B2 * | 4/2016 | Berndt | ............. | G01N 35/1016 |
| 9,346,045 B2 * | 5/2016 | Blumentritt | ............ | G01F 23/02 |
| 9,395,226 B2 * | 7/2016 | Wernet | ..................... | G01F 23/26 |
| 9,529,009 B2 * | 12/2016 | Tanoue | ................ | G01F 23/263 |
| 9,671,419 B2 * | 6/2017 | Sugiyama | ............ | G01N 35/021 |
| 10,401,209 B2 * | 9/2019 | Yarnell | ............. | G01N 35/1009 |
| 10,760,939 B2 * | 9/2020 | Yarnell | ............. | G01N 35/1009 |
| 2002/0001545 A1 * | 1/2002 | Cronenberg | ........... | G01N 35/10 422/525 |
| 2007/0068806 A1 * | 3/2007 | Yang | ................ | G01N 33/48771 204/403.01 |
| 2015/0114123 A1 * | 4/2015 | Schaefer | ................. | B04B 13/00 73/627 |

(56) References Cited

U.S. PATENT DOCUMENTS

OTHER PUBLICATIONS

International Preliminary Report on Patentability and Written Opinion for corresponding PCT application No. PCT/EP2017/068208, dated Jan. 31, 2019.

* cited by examiner

PIPETTING DEVICE HAVING A PIPETTE TIP DETECTION UNIT AND METHOD FOR DETECTING A PIPETTE TIP ON A PIPETTING DEVICE

RELATED APPLICATION

The present application claims the priority of the Swiss patent application CH 00950/16 with filing date 22 Jul. 2016.

TECHNICAL FIELD OF THE INVENTION

The present invention relates to the technical field of automated liquid processing systems and relates in particular to pipetting devices having replaceable pipette tips for aspirating (or rather receiving) and dispensing (or rather supplying) liquid volumes for use in automated laboratory devices or rather systems. A pipetting device comprising a pipette tip detection unit and a method for detecting a pipette tip on such a pipetting device are specified.

BACKGROUND OF THE INVENTION

When large quantities of samples have to be examined in medical, chemical, analytical or pharmaceutical laboratories, automated laboratory systems or rather installations are usually used today to enable rapid and reliable processing of each individual sample. Such laboratory systems are often designed as liquid processing systems for handling liquid volumes, and are suitable for performing certain operations with these samples, such as optical measurements, pipetting, washing, centrifuging, incubating, and filtering. In this case, one or more robot (arms) are typically used for the fully automatic operation of such laboratory systems. These robots are specialized in particular in dealing with liquid containers, for example, sample tubes or microplates, in which the liquid samples are located. Such liquid processing systems comprise in particular pipettors both for aspirating and dispensing liquids or dispensers for dispensing liquids.

In many applications, a fresh pipette tip is used for handling each new sample. Such pipette tips are therefore designed for one-time use and are usually referred to as "disposable pipette tips" or as "disposable tips". Depending on the application, greatly differing liquid volumes are handled during the pipetting. For this purpose, pipette tips of different sizes or rather having different capacity volumes are usually used. Depending on which liquids/samples are handled, different requirements exist, for example, with respect to the size of the opening through which the liquid/sample is aspirated or dispensed, and on the degree of purity (for example, sterility) of the pipette tips used. Moreover, it has to be ensured in many applications that the individual samples do not contaminate the pipetting device. For this purpose, a filter is installed or rather integrated in the upper part of the pipette tip, which is connected to the pipette tube, which filter prevents the sample from penetrating into the pipette tube and thereupon being dispensed therefrom into subsequent samples. Different filters are used for this purpose depending on the type of the sample. It is important that an automated pipetting device is capable of detecting whether a pipette tip is connected to the pipette tube at all, and in particular whether the correct pipette tip is connected to the pipette tube. To solve the last-mentioned problem, either the pipette tips or the pipette tip holders, in which the pipette tips are provided, have been provided with a code or an identification which is optically read. Alternatively, the various pipette tips have been differentiated on the basis of a special geometric feature, for example, fittings of different lengths on the upper part of the pipette tip for the connection to the pipette tube.

The demand therefore exists for means which enable a simple and therefore cost-effective and also reliable detection of various pipette tips. The pipette tip detection is moreover not to obstruct the trend toward greater spatial compaction of the individual components in the pipetting device and a temporal shortening of the pipetting processes.

SUMMARY OF THE INVENTION

It is one object of the present invention to provide a pipetting device which is capable of automatically detecting various pipette tips. This object is achieved according to the invention by the pipetting device defined in claim 1.

It is moreover an object of the present invention to equip a liquid processing system with the proposed pipetting device, to provide an apparatus suitable for laboratory systems or rather facilities. This object is achieved according to the invention by the liquid processing system according to claim 7.

It is a further object of the present invention to provide a method which enables the detection of a pipette tip on a pipetting device.

This object is achieved according to the invention by the method proposed in claim 8.

It is furthermore an object of the present invention to provide a set of pipette tip holders which are suitable for use with the proposed pipetting device and the proposed detection method. Such a set of pipette tip holders according to the invention is set forth in claim 18.

Specific embodiments according to the invention are specified in the dependent claims.

A pipetting device according to the invention comprises:
- a pipette tube, which is formed at its one end for the detachable receiving of a pipette tube for aspirating or dispensing a liquid, and is operationally connectable at its other end to a pressure generating means;
- a capacitance measuring unit for measuring a capacitance, in particular an absolute capacitance, of a measuring capacitor, which comprises a first electrode and a second electrode as a counter electrode; and
- a detection unit for detecting whether a pipette tip is connected to the one end of the pipette tube, and/or for detecting a characteristic feature of the pipette tip which is connected to the one end of the pipette tube, wherein the pipette tip forms at least a part of the first electrode when the pipette tube has an electrical (capacitive) operational connection to the pipette tube.

In one embodiment of the pipetting device, the detection unit is designed such that the detection is carried out by means of at least one comparison of a measured value of the capacitance, in particular the absolute capacitance, to one or more reference values stored, for example, in the detection unit.

In a further embodiment of the pipetting device, at least a part of the second electrode is formed by at least one of the following:
- a pipette tip holder (implemented, for example, as a separate/dedicated "measuring station" of the liquid processing system) having at least one receptacle for receiving the pipette tip;
- at least a part of a support for the placement of a pipette tip holder having at least one receptacle for receiving the pipette tip;

at least a part of a worktable over which the pipette tube is movable;

one or more (adjacent) pipette tips;

one or more (adjacent) "z rods" or rather pipette tube holders, which are suitable for the attachment and vertical movement of a pipette tube.

The second electrode, i.e., the counter electrode can in principle be any suitable part on or rather component of the liquid processing system or rather laboratory device, in which the pipetting device is used. Thus, for example, a metallic plate could be vertically attached on the side of the worktable, wherein the pipette tube is moved by means of a robot arm toward this plate for the capacitance measurement. Instead of the worktable below the pipetting device, a conductive ceiling or rather cover (or at least a part thereof) above the pipetting device could also be used as the second electrode. Moreover, a pipette tube holder, for example, in the form of a conductive perforated plate, could also assume the function of a "measuring station" as a component of the liquid processing system. In particular, one or more adjacent "z rods" could also be used as the counter electrode. Each pipetting tube is attached to such a vertically arranged "z rod", which is thus used as a pipette tube holder, which may be moved up and down, i.e., in the "z direction" by means of a drive, so that the pipetting tube fastened thereon together with connected pipette tip may be lowered or raised (vertically) by the z rod. The z rod can be implemented, for example, as a toothed rack, which is driven by means of a gearwheel. To be able to be used as a counter electrode, the z rod has to consist of a conductive material and has to be electrically insulated from the pipette tube, wherein it is connected to ground or rather is at reference potential, for example.

In a further embodiment of the pipetting device, the reference values for the capacitance, in particular the absolute capacitance, of different pipette tips are identifying.

In a further embodiment of the pipetting device, the reference values are dependent on one or more of the following properties:

a material of which the pipette tip consists;

a geometry of the pipette tip, in particular a shape of the pipette tip, for example, an outer contour of the pipette tip, furthermore in particular a diameter and/or a length of the pipette tip;

a material of which the pipette tip holder consists;

a geometry of a receptacle for receiving the pipette tip in the pipette tip holder, in particular a shape of the receptacle (or rather is its profile or contour), furthermore in particular a diameter and/or a length of the receptacle;

a coating of the pipette tip, in particular a material of which the coating of the pipette tip consists, furthermore in particular an extension or thickness of the coating of the pipette tip;

a coating of the pipette tip holder, in particular the receptacle, in particular a material of which the coating of the pipette tip holder or rather the receptacle consists, furthermore in particular an extension or thickness of the coating of the pipette tip holder or rather the receptacle;

one or more distances or positions between the pipette tip and one or more (adjacent) pipette tips.

In a further embodiment of the pipetting device, the capacitance measuring unit comprises a capacitance-to-digital converter (CDC) or a time-to-digital converter (TDC). A CDC is a converter which converts capacitances into voltages and is based on the method of the sigma-delta converter. In the CDC method, for an unknown capacitance, its dimension is determined in farads as a digital value. Examples of commercially available CDC modules are the FDC10004 from Texas Instruments and the AD7745 from Analog Devices. In a TDC, the time is measured which is required to charge a capacitor having unknown capacitance and its dimension is determined in farads as a digital value therefrom.

According to a further aspect of the present invention, a liquid processing system comprises a proposed pipetting device.

According to a further aspect of the present invention, a method for detecting a pipette tip on a pipetting device having a pipette tube which is designed at its one end for the detachable receiving of a pipette tip for aspirating or dispensing a liquid, and is operationally connected at its other end to a pressure generating means, comprises the following steps:

connecting the pipette tip to the one end of the pipette tube;

measuring a value of a capacitance, in particular an absolute capacitance, of a measuring capacitor which comprises a first electrode and a second electrode as a counter electrode, wherein the pipette tip forms at least a part of the first electrode, preferably a predominant part of the first electrode;

comparing the measured value of the capacitance, in particular the absolute capacitance, to one or more reference values;

outputting an item of information in dependence on a result of the comparison, which specifies whether a pipette tip is connected to the pipette tube and/or which specifies a characteristic feature of the pipette tip, in particular relating to an embodiment of the pipette tip, for example, a size of the pipette tip.

In one embodiment of the method, at least a part of the second electrode is formed by at least one of the following:

a pipette tip holder (implemented, for example, as a separate/dedicated "measuring station" of the liquid processing system) having at least one receptacle for receiving the pipette tip;

at least a part of a support for the placement of a pipette tip holder having at least one receptacle for receiving the pipette tip;

at least a part of a worktable over which the pipette tube is movable;

one or more (adjacent) pipette tips;

one or more (adjacent) "z rods" or rather pipette tube holders, which are suitable for the attachment and vertical movement of a pipette tube.

In a further embodiment of the method, the measurement instead takes place while the pipette tip is still at least partially located in the receptacle, in particular a part of the pipette tip protrudes into the receptacle.

In a further embodiment of the method, the measurement instead takes place after the pipette tip has been completely removed from the receptacle, in particular after the pipette tip has been removed from the pipette tip holder, and the pipette tip is located above the worktable, which then forms the predominant part of the second electrode in comparison to the pipette tip holder.

In a further embodiment of the method, the measurement instead takes place while the pipette tip is at least partially located adjacent to one or more z rods or rather pipette tube holders, in particular at the same height as them, which then forms/form a predominant part of the second electrode.

In a further embodiment, the method furthermore comprises the following steps:

measuring a prior value of the capacitance, in particular the absolute capacitance, of the measuring capacitor before the pipette tip is connected to the end of the pipette tube;

using the prior value as a reference value during the comparison to the value measured (thereafter).

In a further embodiment of the method, during at least two movements, comprising the movements a) guiding the pipette tube to the pipette tip, b) connecting the pipette tip to the end of the pipette tube, c) taking the pipette tip out of the receptacle, and d) guiding the pipette tip away from the pipette tip holder, a plurality of values of the capacitance, in particular the absolute capacitance, of the measuring capacitor is measured, and a maximum measured value is ascertained from this plurality of values, which is then compared to the one or the multiple reference values.

In a further embodiment of the method, during at least two movements, comprising the movements a) guiding the pipette tube to the pipette tip, b) connecting the pipette tip to the end of the pipette tube, c) taking the pipette tip out of the receptacle, and d) guiding the pipette tip away from the pipette tip holder, a plurality of values of the capacitance, in particular the absolute capacitance, of the measuring capacitor is measured, wherein at least a part of this plurality of values forms a time curve of the capacitance, in particular the absolute capacitance, which is compared to one or more time curves consisting of multiple reference values.

In one embodiment of the method, the value of the capacitance is measured by determining a capacitance change, i.e., a relative capacitance, wherein the capacitance change is induced, for example, by a movement of the first and second electrodes in relation to one another.

In a further embodiment of the method, the reference values for the capacitance, in particular the absolute capacitance, of different pipette tips are identifying.

In a further embodiment of the method, the reference values are dependent on one or more of the following properties:

a material of which the pipette tip consists;

a geometry of the pipette tip, in particular a shape of the pipette tip, for example, an outer contour of the pipette tip, furthermore in particular a diameter and/or a length of the pipette tip;

a material of which the pipette tip holder consists;

a geometry of a receptacle for receiving the pipette tip in the pipette tip holder, in particular a shape of the receptacle, furthermore in particular a diameter and/or a length of the receptacle;

a coating of the pipette tip, in particular a material of which the coating of the pipette tip consists, furthermore in particular an extension or thickness of the coating of the pipette tip;

a coating of the pipette tip holder, in particular the receptacle, in particular a material of which the coating of the pipette tip holder or rather the receptacle consists, furthermore in particular an extension or thickness of the coating of the pipette tip holder or rather the receptacle;

one or more distances or positions between the pipette tip and one or more (adjacent) pipette tips.

According to a further aspect of the present invention, a set of pipette tip holders is proposed, wherein each pipette tip holder has at least one receptacle for receiving a pipette tip, and wherein a geometry of the receptacle, in particular a shape of the receptacle, furthermore in particular a diameter and/or a length of the receptacle, is implemented such that in the proposed pipetting device or the proposed liquid processing system or the proposed method, different reference values result for various types of pipette tips, wherein the various types of pipette tips differ in particular by way of one of the following features:

(capacity/rated) volume;

tip opening size/diameter for aspirating and dispensing a liquid;

with or without filter to prevent contaminations of the pipette tube during the aspiration of a sample, and also in particular a type of the filter;

purity category;

intended use;

sealing capability of a fitting of the pipette tip on the pipette tube, and wherein in particular the outer geometry of the various types of pipette tips is identical.

In one embodiment, additionally or alternatively to the geometry of the receptacle, the pipette tip holder, in particular the receptacle or a region thereof and/or around it, is coated such that in the proposed pipetting device or the proposed liquid processing system or the proposed method, different reference values result for different pipette tips, for example, as a result of the material of the coating and/or a thickness of the coating, wherein the coating in particular forms at least a part of a dielectric material between the first and second electrode.

BRIEF DESCRIPTION OF THE DRAWINGS

Nonlimiting embodiment examples of the present invention are explained in more detail below by reference to the figures. In the figures:

FIGS. 4a), b) and c) show schematic illustrations of three arrangements for measuring the capacitance according to one exemplary embodiment of an alternative method according to the invention for detecting a pipette tip;

In the figures, identical reference numerals stand for identical elements.

DETAILED DESCRIPTION OF THE INVENTION

Figure 1:
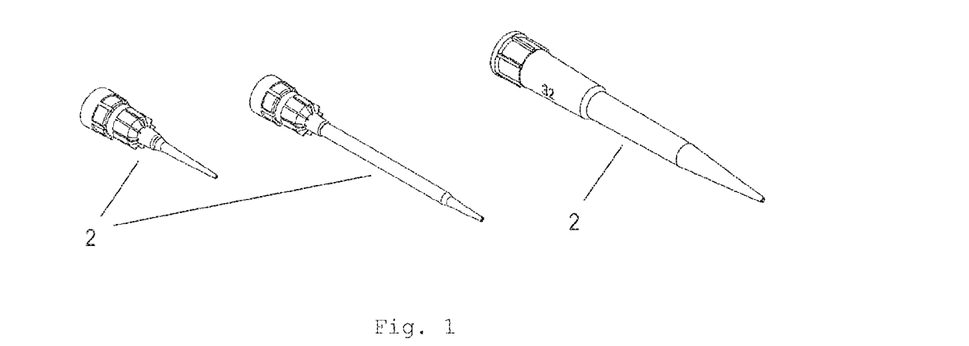
FIG. 1 shows three different pipette tips.

FIG. 1 shows three disposable pipette tips ("disposable tips", DiTi) 2 having different liquid capacities/rated volumes (10 µL, 50 µL, & 200 µL). They consist of a conductive polypropylene and thus enable a capacitive liquid level detection (cLLD). Such pipette tips are available not only in different sizes, but rather there are also those with a filter which prevents the sample liquid from penetrating into the pipette tube and contaminating it. Furthermore, there are pipette tips of different purities (for example, the variants "standard", "pure", and "sterile" from Tecan). These pipette tips can be of equal size, so that a visual differentiation between the various types can be difficult. Moreover, these pipette tips only have a very low weight, so that the pipetting device can only establish with difficulty on the basis of this weight whether a pipette tip is connected to the pipette tube at all.

The core concept of the present invention is to use the conductive pipette tip as an electrode (or rather at least as a partial electrode) of a measuring capacitor, wherein the counter electrode (or rather part thereof) is formed, for example, by the pipette tip holder, in particular by the pipette tip receptacle in the pipette tip holder, in which the pipette tips are provided for the pipetting device. The conductive worktable on which the pipetting procedures take place can moreover form a further part of the counter electrode. Furthermore, a conductive support for placement of a pipette tip holder on the worktable can also form a part of the counter electrode. In principle, the pipette tip holder does not have to consist of a conductive material, and in this case would form the dielectric material (or rather part thereof) of the measuring capacitor. Every pipette tip can be reliably detected on the basis of the measured value of the capacitance, in particular the absolute capacitance, of the measuring capacitor.

Figure 2:
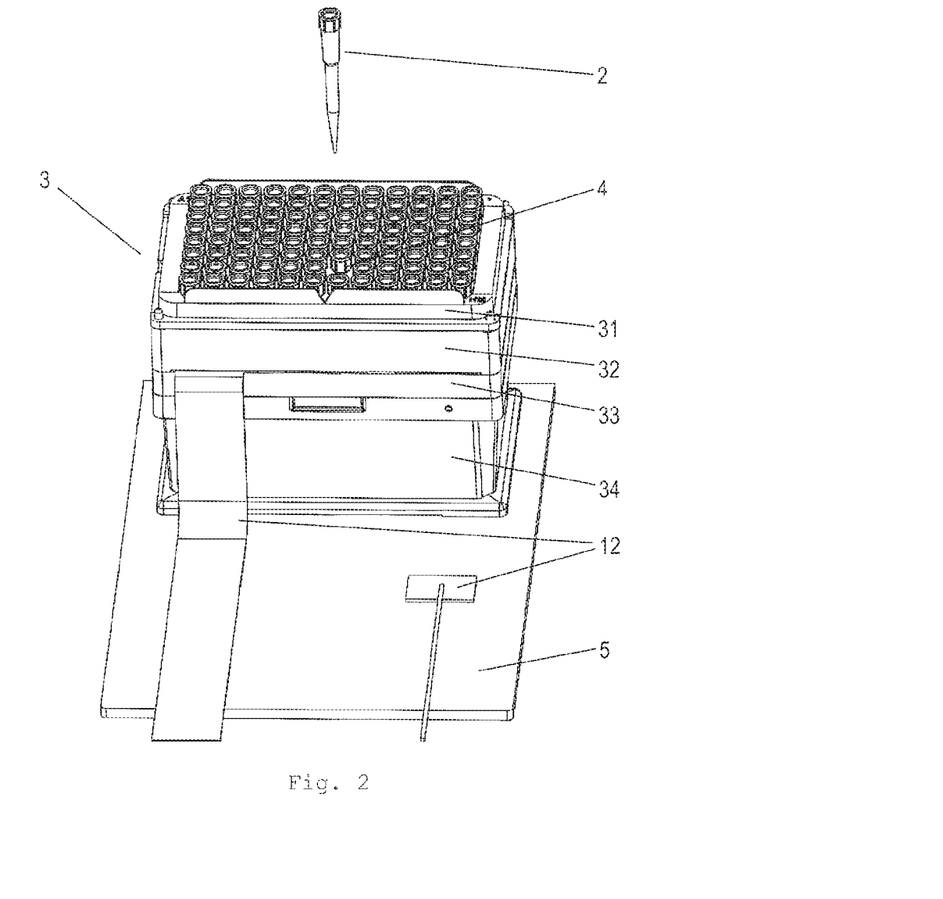
FIG. 2 shows a pipette tip holder having inserted pipette tips.

FIG. 2 shows such a pipette tip holder 3 having a plurality of pipette tips 2 inserted into the receptacles 4. The pipette tip holder 3 is implemented in multiple parts in the present case having an upper part 31, a middle part 32, and a lower part 33. The receptacles 4 are in the upper part 31 and middle part 32, wherein the pipette tips 2 rest on the upper part 31. The upper part 31 and/or the middle part 32 is/are nonconductive, wherein the nonconductive part acts as the dielectric material of the measuring capacitor. The lower part 33 is implemented as a conductive perforated plate and (at least partially) forms the counter electrode of the measuring capacitor, wherein the receptacles 4 protrude into the perforated plate 33. The pipette tip holder 3 is located on a worktable 5, which is at the reference potential, in particular is connected to ground. The perforated plate 33 can be electrically connected to ground either via a conductive connection 12 or a conductive support 34. A capacitance measuring unit is connected, on the one hand, to the pipette tube and, on the other hand, to the worktable 5 and, via this, to the support 34 standing thereon and the pipette tip holder 3, in particular to the lower part 33, i.e., the conductive perforated plate. The pipette tube without pipette tip 2 already forms a small electrode, so that the measuring capacitor formed by this arrangement still has a minor capacitance without pipette tip 2. As soon as the pipette tip 2 is connected to the pipette tube, the value of the measured capacitance increases strongly, wherein the value is dependent on the type (for example, the size) of the pipette tip 2, and therefore this type can be reliably detected via the measured capacitance value.

Figure 3:
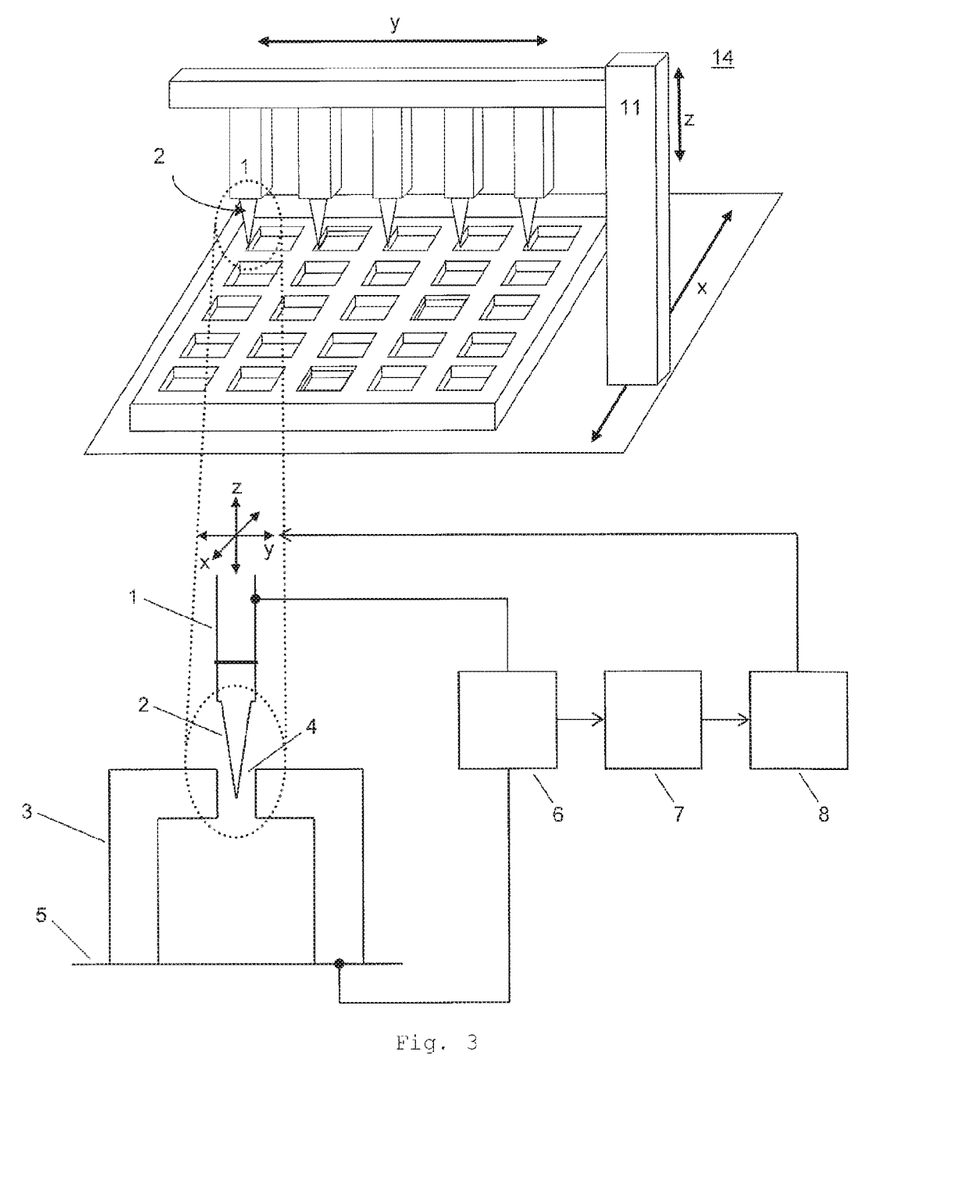
FIG. 3 shows a schematic illustration of an exemplary embodiment of a pipetting device according to the invention or rather a liquid processing system according to the invention.

FIG. 3 illustrates, in a simplified schematic illustration, an exemplary embodiment of a pipetting device according to the invention. This figure shows the pipette tube 1 with an attached pipette tip 2, which was previously taken from a receptacle 4 of the pipette tip holder 3 and is now moved vertically upward by a robot arm 11 to a liquid processing system 14 and is thus removed from the pipette tip holder 3. A capacitance measuring unit 6, which is connected to the pipette tube 1 and thus also to the pipette tip 2 as the first electrode and to the worktable 5 and thus also to the pipette tip holder 3 (or a component thereof) as a second (counter) electrode, can determine the (absolute) capacitance of the measuring capacitor comprising these two electrodes in this case. The measured value of the capacitance will be different depending on the type or nature (for example, size/capacity volume) of the pipette tip 2. For this purpose, the measured value of the capacitance is compared in a detection unit 7 to various reference values, wherein each reference value is characteristic of a specific type or a specific nature of pipette tip 2. The detection unit 7 then relays an item of information as to whether a pipette tip 2 is connected to the pipette tube 1, and if so which type or nature of pipette tip 2 it is, to a control unit 8 of a drive for the robot arm 11.

Such a pipette tip holder 3 can also be part of the liquid processing system 14, for example, wherein the robot arm 11, to determine the capacitance and thus to detect the pipette tip type or rather the pipette tip size, moves the pipette tube 1 having connected pipette tip 3 in each case toward the pipette tip holder 3 and lowers it into the receptacle 4 for the capacitance measurement. The pipette tip holder 3 thus represents a separate/dedicated "measuring station" for the pipette tip detection inside the liquid processing system 14.

Figure 4:
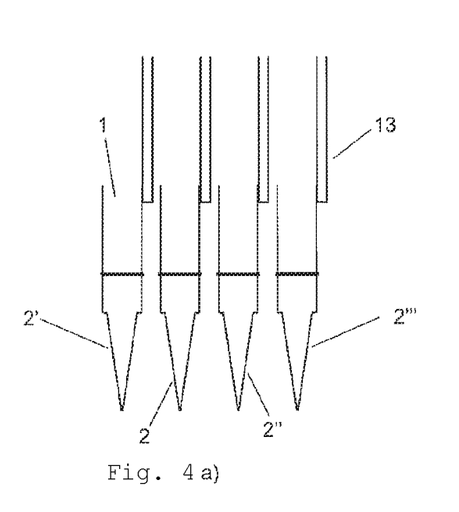

FIGS. 4a), b) and c) illustrate, in schematic illustrations, three arrangements for measuring the capacitance according to an alternative embodiment of the method according to the invention for detecting the pipette tip 2. In a first alternative embodiment of the method, the adjacent pipette tips 2', 2'', 2''' form the counter electrode (=second electrode) to the first electrode, which comprises the pipette tip 2 (see FIG. 4a)). A single one of the three adjacent pipette tips 2', 2'', 2''' is already sufficient to execute this embodiment of the method. FIG. 4b) shows the case in which no pipette tip 2 is attached to the pipette tube 1. In this case, the (absolute) capacitance of the measuring capacitor will be less than if a pipette tip 2 is located on the pipette tube 1, since the first electrode now substantially only comprises the pipette tube 1, so that the detection unit 7 will establish on the basis of the comparison to the reference values that no pipette tip 2 is connected to the pipette tube 1. A further embodiment of the method is shown in FIG. 4c), in which the pipette tip 2 as the first electrode is positioned for capacitance measurement next to multiple adjacent "z rods" or rather pipette tube holders 13 as (part of) the second electrode (i.e., as the counter electrode). For this purpose, the adjacent z rods (with or without connected pipette tube 1 and tip 2', 2'', 2''') are lowered to approximately the same height as the pipette tip 2 to be detected (indicated by the vertical double arrow in the z direction).

Figure 5A:
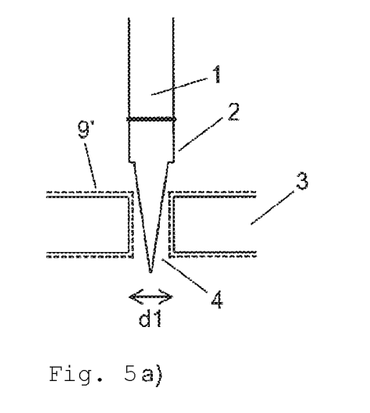
FIGS. 5a), b), c) and d) show schematic illustrations of four different exemplary embodiments of receptacles in pipette tip holders according to the invention.
Figure 5B:
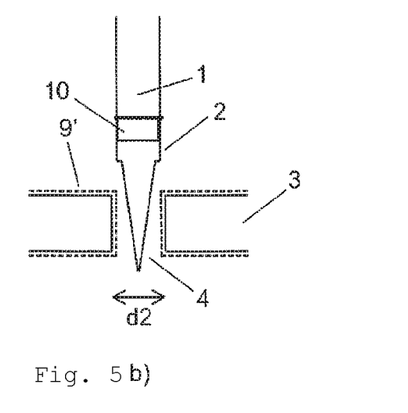
Figure 5C:
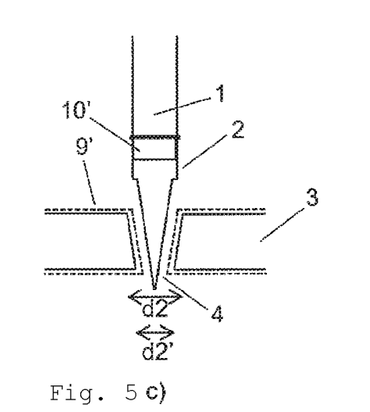
Figure 5D:
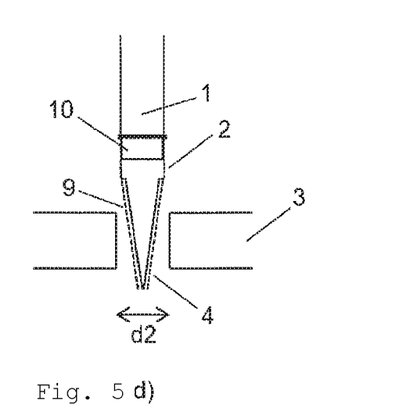

In FIGS. 5a), b), c) and d), four different exemplary embodiments of receptacles 4 in pipette tip holders 3 according to the invention are schematically illustrated. In FIG. 5a), the receptacle 4 is implemented as a cylindrical borehole having a diameter d1. The capacitance which results when the pipette tip 2 is connected to the pipette tube 1 and is located in the receptacle 4 (electrically insulated therefrom) has a specific value, which is characteristic for this arrangement and is used as a reference value in the detection unit 7 for detecting this pipette tip 2. In FIG. 5b), a filter 10 is installed or rather integrated in the pipette tip 2. To be able to detect this type of pipette tip 2 having filter 10, for example, a borehole having a larger diameter d2 can be used for the receptacle 4. Because of the modified geometry, the measured capacitance of this electrode arrangement will also be different. Alternatively, the vertical thickness of the receptacle 4 could be selected differently. This would also result in a change of the measured capacitance. A further possibility is illustrated in FIG. 5c), where the shape of the receptacle 4 was modified and is now implemented as conical having maximum diameter d2 and minimum diameter d2'. This also in turn results in a change of the measured capacitance and could be used as a characteristic feature for a pipette tip 2 having a different type of filter, whereby a corresponding reference value is stored in the detection unit 7 for detecting this pipette tip 2. Furthermore, as shown in FIG. 5d), the pipette tip 2 could also, for example, be provided with a coating 9 as a dielectric material (an insulator), which in turn has the result that the measured capacitance has a different value, which is characteristic for this pipette tip 2. Instead of coating the pipette tip 2, the pipette tip holder 3 and in particular the receptacle 4 could also be provided with a coating 9' (as a dielectric material and insulator) to achieve a change of the measured capacitance (see FIGS. 5a)-c)). In principle, any features of the first and second electrode (for example, the size, material, shape thereof) or the intermediate space between them, which forms the dielectric material of the measuring capacitor, could be changed in any manner to obtain a desired capacitance of the measuring capacitor, the value of which is identifying as a reference value for a specific measuring arrangement and thus for a specific type or nature of pipette tip 2.

Figure 6:
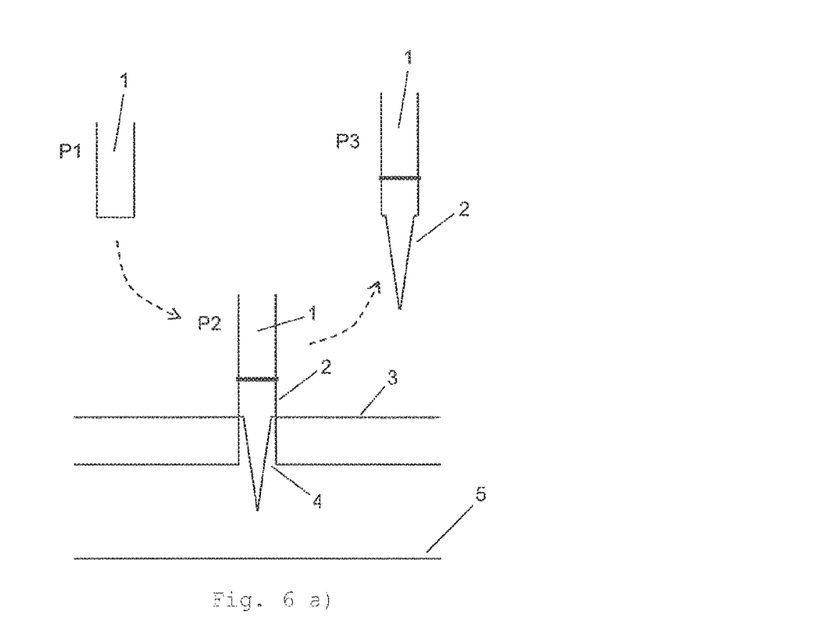
FIG. 6a) shows a schematic illustration of the movement sequence during the receiving of a pipette tip by a pipette tube at the positions P1, P2, & P3.
FIG. 6b) shows time curves of the absolute capacitance for three pipette tips of different sizes (having marks at the positions P1, P2, & P3 from FIG. 6a)).

FIG. 6a) schematically illustrates the movement sequence during the receiving of a pipette tip 2 by the pipette tube 1, wherein three specific positions P1, P2, & P3 are shown. In FIG. 6b), the time curve of the measured absolute capacitance for the movement sequence according to FIG. 6a) is shown, for three pipette tips 2 of different sizes having capacity/rated volume 10 µL, 50 µL, & 200 µL. At the position P1, a pipette tip 2 is not yet located on the pipette tube 1 and the measured capacitance is approximately 0 pF. Upon receiving of the pipette tip 2 by the pipette tube 1 from the receptacle 4 in the pipette tip holder 3, i.e., at the position P2, the measured capacitance is maximum (wherein the pipette tip 2 and the receptacle 4 are electrically insulated from one another). Depending on the size of the pipette tip 2, the value of the measured capacitance is approximately 2.1 pF, 3.1 pF, & 4.8 pF. These values approximately correspond to the reference values which are stored in the detection unit 7 for detecting these three different pipette tips 2. Furthermore, it is apparent from the graphic in FIG. 6b) that the measured capacitance is higher at the position P3 (approximately 0.2 pF, 0.5 pF, & 0.6 pF) than at the position P1, since the pipette tip 2 now acts as the first electrode (or rather as an additional part thereof). Therefore, for example, after the removal of the pipette tip 2 from the receptacle 4, it can be checked whether the pipette tip 2 is also actually connected to the pipette tube 1, or whether the receiving of the pipette tip 2 has not succeeded.

LIST OF REFERENCE SIGNS 1 pipette tube
2 pipette tip
2' first adjacent pipette tip
2" second adjacent pipette tip
2'" third adjacent pipette tip
3 pipette tip holder/carrier
31 upper part of the pipette tip holder
32 middle part of the pipette tip holder
33 lower (conductive) part of the pipette tip holder
34 support of the pipette tip holder
4 receptacle
5 worktable
6 capacitance measuring unit
7 detection unit
8 control unit for the movement control of the drive/robot arm
9 coating of the pipette tip
9' coating of the pipette tip holder
10 filter
11 drive/robot arm
12 connection to ground/reference potential
13 z rod/pipette tube holder
14 liquid processing system
d1 diameter of receptacle for pipette tip without filter
d2 (large) diameter of receptacle for pipette tip with filter
d2' small diameter of receptacle for pipette tip with filter
P1 first position of the pipette tube (during approach to the pipette tip holder before receiving the pipette tip)
P2 second position of the pipette tip (during the receiving of the pipette tip from the pipette tip holder)
P3 third position of the pipette tip (during the movement away from the pipette tip holder after receiving the pipette tip)

The invention claimed is:

1. Pipetting device comprising:
   a pipette tube (1), which is formed at its one end for the detachable receiving of a pipette tip (2) for aspirating or dispensing a liquid, and is operationally connectable at its other end to a pressure generating means;
   a capacitance measuring unit (6) for measuring a capacitance, in particular an absolute capacitance, of a measuring capacitor, which comprises a first electrode and a second electrode as a counter electrode; and
   a detection unit (7) for detecting whether a pipette tip (2) is connected to the one end of the pipette tube (1), and/or for detecting a characteristic feature of the pipette tip (2), which is connected to the one end of the pipette tube (1),
   wherein the pipette tip (2) forms at least a part of the first electrode when the pipette tip (2) is electrically operationally connected to the pipette tube (1),
   wherein the detection unit (7) is designed such that the detection is performed by means of at least one comparison of a measured value of the capacitance, in particular the absolute capacitance, to one or more reference values, and
   wherein at least a part of the second electrode is formed by at least one of the following:
      a pipette tip holder (3) having at least one receptacle (4) for receiving the pipette tip (2);
      at least a part of a support (33) for placement of a pipette tip holder (3) having at least one receptacle (4) for receiving the pipette tip (2);
      at least a part of a worktable (5), over which the pipette tube (1) is movable;
      one or more pipette tips (2', 2", 2'");
      one or more pipette tube holders (13), which are adapted for the attachment of a pipette tube (1).

2. Pipetting device according to claim 1, wherein the reference values are characteristic for the capacitance, in particular the absolute capacitance, of different pipette tips (2).

3. Pipetting device according to claim 1, wherein the reference values are dependent on one or more of the following properties:
   a material of which the pipette tip (2) consists;
   a geometry of the pipette tip (2), in particular a shape of the pipette tip (2), furthermore in particular a diameter and/or a length of the pipette tip (2);

a material of which the pipette tip holder (3) consists;

a geometry of a receptacle (4) for receiving the pipette tip (2) in the pipette tip holder (3), in particular a shape of the receptacle (4), furthermore in particular a diameter and/or a length of the receptacle (4);

a coating (9) of the pipette tip (2), in particular a material of which the coating (9) of the pipette tip (2) consists, furthermore in particular an extension or thickness of the coating (9) of the pipette tip (2);

a coating (9') of the pipette tip holder (3), in particular of the receptacle (4), in particular a material of which the coating (9') of the pipette tip holder (3) or rather the receptacle (4) consists, furthermore in particular an extension or thickness of the coating (9') of the pipette tip holder (3) or rather the receptacle (4);

one or more distances or positions between the pipette tip (2) and one or more other pipette tips (2', 2", 2"').

4. Pipetting device according to claim 1, wherein the capacitance measuring unit (6) comprises a capacitance-to-digital converter or a time-to-digital converter.

5. Liquid processing system (14) comprising a pipetting device according to claim 1.

6. Set of pipette tip holders (3), wherein each pipette tip holder (3) has at least one receptacle (4) for receiving a pipette tip (2), and wherein a geometry of the receptacle (4), in particular a shape of the receptacle (4), furthermore in particular a diameter and/or a length of the receptacle (4) is adapted such that in the pipetting device according to claim 1, different reference values result for various types of pipette tips (2), wherein the various types of pipette tips (2) differ in particular by way of one of the following features:
volume;
tip opening size/diameter for aspirating and dispensing a liquid;
with or without filter for preventing contaminations of the pipette tube (1) during the aspiration of a sample, and in particular a type of the filter;
purity category;
intended use;
sealing capability of a connection of the pipette tip (2) to the pipette tube (1),
and wherein in particular the outer geometry of the various types of pipette tips (2) can be identical.

7. Set of pipette tip holders (3) according to claim 6, wherein additionally or alternatively to the geometry of the receptacle (4), the pipette tip holder (3), in particular the receptacle (4) or a region thereof and/or around it is coated such that in the pipetting device, different reference values result for different pipette tips (2), for example, as a result of a material of the coating (9') and/or a thickness of the coating (9'), wherein the coating (9') in particular forms at least a part of a dielectric material between the first and second electrode.

8. The method for detecting a pipette tip (2) on a pipetting device having a pipette tube (1), which is designed at its one end for the detachable receiving of a pipette tip (2) for aspirating or dispensing a liquid, and is operationally connected at its other end to a pressure generating means, wherein the method comprises the following steps:
connecting the pipette tip (2) to the one end of the pipette tube (1);
measuring a value of a capacitance, in particular an absolute capacitance, of a measuring capacitor, which comprises a first electrode and a second electrode as a counter electrode, wherein the pipette tip (2) forms at least a part of the first electrode, preferably a predominant part of the first electrode;

comparing the measured value of the capacitance, in particular the absolute capacitance, to one or more reference values;
outputting an item of information in dependence on a result of the comparison, which specifies whether a pipette tip (2) is connected to the pipette tube (1), and/or which specifies a characteristic feature of the pipette tip (2), in particular relating to a design of the pipette tip (2),
wherein at least a part of the second electrode is formed by at least one of the following:
a pipette tip holder (3) having at least one receptacle (4) for receiving the pipette tip (2);
at least a part of a support (33) for the placement of a pipette tip holder (3) having at least one receptacle (4) for receiving the pipette tip (2);
at least a part of a worktable (5), over which the pipette tube (1) is movable;
one or more pipette tips (2', 2", 2"');
one or more pipette tube holders (13), which are adapted for connecting a pipette tube (1).

9. Method according to claim 8, wherein the measurement takes place while the pipette tip (2) is still at least partially located in the receptacle (4), in particular a part of the pipette tip (2) protrudes into the receptacle (4).

10. Method according to claim 8, wherein the measurement takes place after the pipette tip (2) has been completely removed from the receptacle (4), in particular after the pipette tip (2) has been removed from the pipette tip holder (3), and the pipette tip (2) is located above the worktable (5), which then forms a predominant part of the second electrode in comparison to the pipette tip holder (3).

11. Method according to claim 8, wherein the measurement takes place while the pipette tip (2) is still at least partially located adjacent to one or more pipette tube holders (13), in particular is at the same height as these, which then form a predominant part of the second electrode.

12. Method according to claim 8, further comprising:
measuring a prior value of the capacitance, in particular the absolute capacitance, of the measuring capacitor before the pipette tip (2) is connected to the end of the pipette tube (1);
using the prior value as a reference value upon the comparison to the measured value.

13. Method according to claim 8, wherein during at least two movements, comprising the movements a) guiding the pipette tube (1) to the pipette tip (2), b) connecting the pipette tip (2) to the end of the pipette tube (1), c) taking the pipette tip (2) out of the receptacle (4), and d) guiding the pipette tip (2) away from the pipette tip holder (3), a plurality of values of the capacitance, in particular the absolute capacitance, of the measuring capacitor are measured, and a maximum value is ascertained from this plurality of values, which is compared to the one or the multiple reference values.

14. Method according to claim 8, wherein during at least two movements, comprising the movements a) guiding the pipette tube (1) to the pipette tip (2), b) connecting the pipette tip (2) to the end of the pipette tube (1), c) taking the pipette tip (2) out of the receptacle (4), and d) guiding the pipette tip (2) away from the pipette tip holder (3), a plurality of values of the capacitance, in particular the absolute capacitance, of the measuring capacitor are measured, wherein at least a part of this plurality of values forms a time curve of the capacitance, in particular the absolute capacitance, which is compared to one or more time curves consisting of multiple reference values.

15. Method according to claim 8, wherein the reference values are characteristic for the capacitance, in particular the absolute capacitance, of different pipette tips (2).

16. Method according to claim 8, wherein the reference values are dependent on one or more of the following characteristics:
- a material of which the pipette tip (2) consists;
- a geometry of the pipette tip (2), in particular a shape of the pipette tip (2), furthermore in particular a diameter and/or a length of the pipette tip (2);
- a material of which the pipette tip holder (3) consists;
- a geometry of a receptacle (4) for receiving the pipette tip (2) in the pipette tip holder (3), in particular a shape of the receptacle (4), furthermore in particular a diameter and/or a length of the receptacle (2);
- a coating (9) of the pipette tip (2), in particular a material of which the coating (9) of the pipette tip (2) consists, furthermore in particular an extension or thickness of the coating (9) of the pipette tip (2);
- a coating (9') of the pipette tip holder (3), in particular the receptacle (4), in particular a material of which the coating (9') of the pipette tip holder (3) or rather the receptacle (4) consists, furthermore in particular an extension or thickness of the coating (9') of the pipette tip holder (3) or rather the receptacle (4);
- one or more distances or positions between the pipette tip (2) and one or more other pipette tips (2', 2", 2"').

* * * * *